(12) United States Patent
Peinecke

(10) Patent No.: US 6,455,184 B1
(45) Date of Patent: Sep. 24, 2002

(54) GAS DISTRIBUTOR FOR A FUEL CELL

(75) Inventor: Volker Peinecke, Esslingen (DE)

(73) Assignee: Forschungszentrum Jülich GmbH, Jülich (DE)

( * ) Notice: Subject to any disclaimer, the term of this patent is extended or adjusted under 35 U.S.C. 154(b) by 94 days.

(21) Appl. No.: 09/642,602

(22) Filed: Aug. 22, 2000

Related U.S. Application Data

(63) Continuation-in-part of application No. PCT/DE99/00536, filed on Feb. 19, 1999.

(30) Foreign Application Priority Data

Feb. 27, 1998 (DE) .......................................... 198 08 331

(51) Int. Cl.$^7$ ................................................ H01M 8/02
(52) U.S. Cl. ............................ 429/39; 429/38; 429/34
(58) Field of Search .............................. 429/34, 38, 39, 429/12, 28, 27, 32

(56) References Cited

U.S. PATENT DOCUMENTS 3,101,285 A    8/1963   Tantrum et al.
4,615,955 A   10/1986   Amakawa et al.
5,804,326 A  * 9/1998   Chow et al. ................. 429/26

FOREIGN PATENT DOCUMENTS

| DE | 197 46 074 | 5/1998 |
| DE | 197 15 256 | 8/1998 |
| EP | 0 440 968  | 8/1991 |
| JP | 59 027465  | 2/1984 |
| JP | 60 227361  | 11/1985 |
| JP | 63 136471  | 6/1988 |
| JP | 02 040862  | 2/1990 |
| JP | 07 029579  | 1/1995 |
| WO | WO 94/09519 | 4/1994 |

* cited by examiner

Primary Examiner—Stephen Kalafut
Assistant Examiner—R Alejandro
(74) Attorney, Agent, or Firm—Klaus J. Bach

(57) ABSTRACT

In a fuel cell comprising two electrodes, an electrolyte disposed between the electrodes and fluid conducting means for supplying an operating fluid to the electrodes and removing the depleted operating fluid from the electrodes, the flow conducting means include fluid supply passages supplying the operating fluid to the electrodes in a direction normal to the electrode surface and depleted fluid discharge passages for removing the depleted operating fluid from the electrode surfaces also in a direction normal to the electrode surfaces.

3 Claims, 1 Drawing Sheet

GAS DISTRIBUTOR FOR A FUEL CELL

This is a continuation-in-part application of international application PCT/DE99/00536 filed 02/19/99 and claiming the priority of German application No. 198 08 331.9 filed Feb. 27,1998.

BACKGROUND OF THE INVENTION

The invention relates to a fuel cell and more particularly to a gas distributor for a fuel cell.

The printed publication DE 44 30 958 C1 and the printed publication DE 195 31 852 C1 disclose fuel cells which include a cathode and an electrolyte as well as an anode. The cathode is disposed in a so-called cathode chamber. The anode is disposed in an anode chamber. An oxidation fluid such as air is supplied to the cathode chamber and fuel such as hydrogen is supplied to the anode chamber. The interface between an electrode and the electrolyte is called the active area. The two-dimensional surface area of the electrode, which is parallel to the active area is called electrode surface.

The German published patent application 197 15 256.7-45 discloses the provision of distribution structures in the electrode chambers. The distribution structures shown therein have a comb-like shape. They are said to provide for a uniform distribution of the operating fluid in the respective electrode chamber.

The operating fluids pass through the electrode chambers (anode and cathode chamber) and are consumed (depleted) in the process. Subsequently, the consumed or rather depleted operating media exit again from the respective electrode chambers.

On the cathode of the high temperature fuel cell disclosed in the printed publication DE 44 30 958 C1 oxygen ions are formed in the presence of the oxidation fluid. The oxygen ions travel through the solid electrolyte and recombine on the anode side with the hydrogen of the fuel so as to form water. With the recombination electrons are released which provide an electric energy potential.

The DE 195 31 852 C1 discloses a PEM-fuel cell at whose anode protons are generated by means of a catalyst in the presence of the fuel. The protons travel through the electrolyte membrane and combine at the cathode side with the oxygen from the oxidation fluid to form water. Electrons are released at the anode and consumed at the cathode whereby an electric potential between the electrode, that is electric energy, is generated. In order to achieve a good efficiency, the operating media must be distributed in the anode and cathode chambers uniformly over the electrode surfaces. Pressure losses of the operating fluids flowing through the fuel cell should be avoided or kept at a minimum. Pressure losses result in energy losses.

Generally, a mixture of gases and/or liquids is present in an electrode chamber of a fuel cell. The gas may be a mixture of a fuel gas and an inert gas. By the reformation or oxidation of a fuel such as a methanol-water mixture, other inert gases such as $CO_2$ may form in the respective electrode chamber. Air and, together therewith the inert gas nitrogen is generally supplied to the cathode.

The gases or liquids present at the respective electrodes must generally be kept well mixed in order to achieve a good performance.

If non-wetted gases, that is, gases, which have not been wetted in separate moistening apparatus, are to be supplied to a PEM fuel cell, the electrode surfaces have to be contacted by the operating fluid in a particularly uniform way. Otherwise, there is the danger that the electrode and, if applicable, the electrolyte membrane develop dried out areas. Local drying out may result in performance losses and in damages.

As the operating fluids flow parallel and adjacent to, the electrode surfaces over extended areas thereof they are increasingly depleted. In accordance therewith, the respective reactions differ locally in a qualitative respect.

It must be ensured that good electrical contacts are provided in the fuel cell. Thermal gradients must be avoided since they may have detrimental effects.

It is the object of the present invention to provide a fuel cell with an improved operating fluid supply and discharge system as compared to the fuel cells disclosed in the state of the art referred to above.

SUMMARY OF THE INVENTION

In a fuel cell comprising two electrodes, an electrolyte disposed between the electrodes and fluid conducting means for supplying an operating fluid to the electrodes and removing the depleted operating fluid from the electrodes, the fluid conducting means include fluid supply passages supplying the operating fluid to the electrodes in a direction normal to the electrode surface and depleted fluid discharge passages for removing the depleted operating fluid from the electrode surfaces also in a direction normal to the electrode surfaces.

The fuel cell includes an electrode with an open porosity. An electrolyte is disposed adjacent one side of the electrode. Adjacent the other side, a plurality of supply and discharge passages is disposed for supplying an operating fluid to the electrode.

A supply passage is a channel through which a fresh operating fluid is conducted to an active area of the electrode. A discharge passage is a channel by way of which the operating fluid depleted at the active area of the electrode is conducted out of the fuel cell. A channel to which fresh and depleted operating fluid is conducted is not a supply or discharge passage as defined in the claims.

The operating fluid for the electrode at one side of the electrolyte is fuel (hydrogen) and for the electrode at the opposite side of the electrolyte is oxygen (air).

Each supply passage joins a discharge passage. In contrast to the state of the art, the operating fluids are not discharged by way of the electrode chamber that is they do not pass through the whole electrode chamber into which they are introduced. Rather, the respective operating fluid leaves the supply passage and enters the electrode chamber fully in the direction normal to the respective electrode surface. As a result of the particular design, the operating fluid supplied by the supply passage then impinges essentially perpendicularly onto the electrode surface. It then flows into an adjacent discharge passage since this path provides the lowest flow resistance. Consequently, the operating fluid flows to the electrode essentially perpendicularly to the electrode surface and is discharged therefrom again essentially perpendicularly to the electrode surface in the opposite direction.

With the supply flows reaching the electrode essentially perpendicularly to the electrode surface fresh operating fluid is uniformly supplied to the whole electrode surface. The problems referred to in the introductory part of the specification are therefore avoided and the performance of the fuel cell is increased.

In a particular embodiment of the invention, the supply and discharge passages extend parallel to the electrode surfaces and are closed at one end. At the side adjacent the electrode, the supply and discharge passages have openings in the form of slots or gaps. In another embodiment, the supply passages extend parallel to the adjacent discharge passages. In this embodiment, it is ensured by simple design means that fresh operating fluid is supplied to a correspondingly large electrode surface essentially in a perpendicular direction.

In still another embodiment of the invention, a supply or discharge passage is provided with openings or bores, which extend between the adjacent electrode surface and the respective supply or discharge passage.

The operating fluid passes through the openings or bores of the supply passage into contact with the active surface and, after depletion at the active electrode surface, returns through the openings or bores in the discharge passage wall into the discharge passage. With the openings or bores, the flow of the operating fluid can be well controlled and dosed.

The diameters, the shapes and/or density (number of openings per passage length) of the openings, bores or slots in the supply and discharge passages may vary in accordance with still another embodiment of the arrangement according to the invention along the length of the passages. In this way, the flow resistances can be adjusted. Adjustment of the flow resistances by differently sizing the openings, bores or slots should be so made that the operating fluid is uniformly distributed along the active surfaces.

In order to achieve a uniform performance in the fuel cells of a stack of fuel cells (along the passages), the operating fluid must be conducted to the active surfaces in a uniform manner. This requires uniform pressure differences for driving the operating fluid.

Essentially, the following effects have to be taken into consideration. In a passage through which a fluid flows, such as a tube, there is always friction, which result in pressure losses. Consequently, the static pressure becomes lower over the length of the tube. With constant flow volume, the gas pressure drops about linearly with the length of the tube—assuming that the geometry of the tube (diameter) remains the same. This pressure loss is proportional to $L/R^4$ (L=length of the tube, R=radius of the tube) in accordance with the Hagen-Poiseuille law. Tubes with large diameters have therefore small pressure losses in comparison with small diameter tubes.

If the tube includes branches (the openings leading to an electrode surface of a fuel cell) the flow is suddenly decreased by the amount flowing through the branch. Beginning at such a branch the pressure losses are then smaller because the flow volume through the tube has become smaller.

Also, the Bernoulli-effect (2. Effect) should be taken into consideration. It states (in a simplified manner) that the sum of the static and dynamic pressures is constant. With increasing dynamic pressure (which is proportional to the square of the flow speed) the static pressure decreases. The faster the flow, the lower is the (static) pressure. This second effect is influenced by the flow speed and consequently by the flow volume, the tube diameter and the branches.

As with increasing length of the main passage, the flow speed decreases abruptly at the branches, in accordance with Bernoulli, the static pressure suddenly increases (abruptly at the branches). This pressure change is superimposed on the pressure loss by friction. It would be ideal to provide for a constant pressure over the length of the passage, which however cannot be achieved. In practice, it is therefore desirable that the same pressure distribution can be achieved in the supply and in the discharge passages. The openings for controlling the pressure distribution have to be designed accordingly.

In the arrangement according to the present invention, the design features to achieve this are quite flexible. It is, for example, possible to increase the diameters of the openings in the supply passage in the flow direction of the operating fluid.

The discharge passage design may be designed in the opposite sense. If the openings are slot-like, the slot width can become increasingly larger or, respectively, smaller in order to achieve a uniform distribution of the operating fluid at the active surface areas providing for a good performance of the fuel cell.

Within the part of the flow passages which includes the holes, means can therefore be provided which compensate for the pressure losses. The pressure drop (over the electrode surface) can be maintained approximately constant for each area adjacent the electrode surface along which the operating fluid passes. The openings act as throttles, or respectively, adjustable flow resistances.

An uncontrolled pressure drop would result in a nonuniform distribution of the operating fluid at the active surface.

In a relatively inexpensive and simple embodiment, electrically conductive metal sheets form the flow passages. Perforated metal sheets may be used for that purpose for example.

The electric current generated by the fuel cell may then be conducted, by way of the metal sheets, for example to a bipolar plate by which two full cells are electrically and mechanically interconnected.

DESCRIPTION OF A PREFERRED EMBODIMENT

Figure 1:
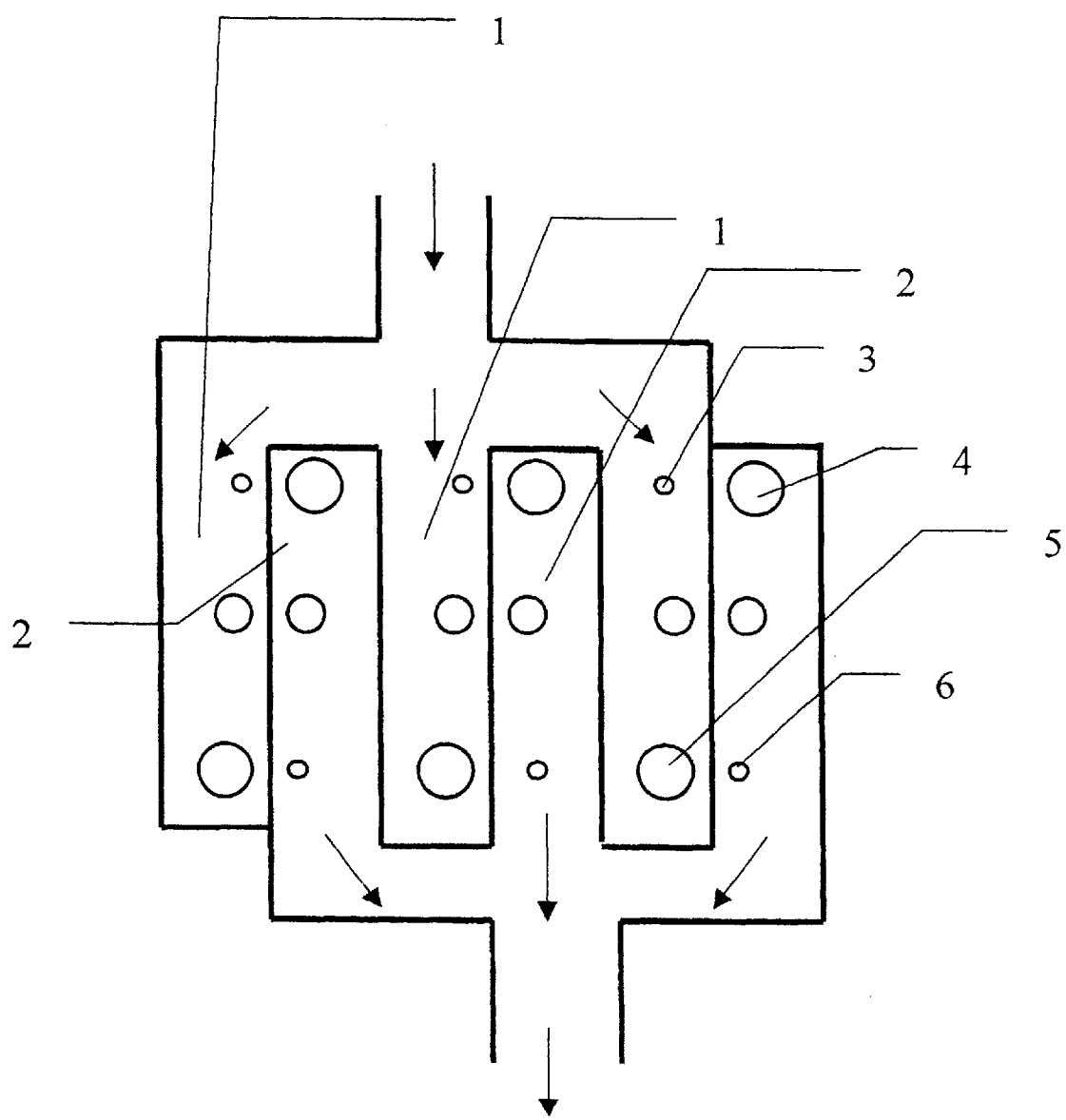
FIG. 1 is a cross-sectional view of the supply and discharge passages according to the invention.

In the arrangement of the flow passages as shown in FIG. 1, an operating fluid is supplied to the supply passages 1 as indicated by the arrows. The supply passages 1 are closed at one end. At their sides, the supply passages include openings (shown by circles). Adjacent each supply passage 1, there is a discharge passage 2. Each discharge passage includes openings similar to those in the supply passages (represented by circles). Below the openings, an electrode with open porosity is disposed which is not apparent from the drawing. An electrolyte is disposed below the electrode.

An operating fluid introduced into the supply passage 1 leaves the supply passage 1 through the openings and, in this way, flows perpendicularly onto the electrode surface. At the electrode surface, the operating fluid is depleted and the flow is redirected at the surface essentially by 180° and then flows back to the discharge passages 2 by way of the discharge passage openings. The depleted operating fluid is then discharged by way of the discharge passages 2.

An opening 3 at the beginning of the supply passage 1 has a smaller diameter than an opening 5 at the end of the supply passage. The opposite is true for the openings 4 and 6 of the discharge passages. With the changed diameters of the openings which are schematically shown in the Fig., the flow behavior of the operating fluid can be suitably controlled so as to provide for a uniform distribution of the operating fluid over the membrane surfaces.

What is claimed is:

1. An operating fluid duct structure for a fuel cell comprising two electrodes, an electrolyte disposed between said electrodes, first fluid conducting means for supplying an operating fluid to, and discharging said operating fluid from, said electrodes, said fluid conducting means including fluid flow supply passages arranged in spaced relationship on one side of an electrode for supplying said operating fluid to said electrode in a direction essentially normal to the surfaces of said electrode and depleted fluid discharge passages disposed at said one side of said electrode in the spaces between, and adjacent to, said fluid flow supply passages for removing the depleted fluid from said electrodes also in a direction normal to the surfaces of said electrodes.

2. An operating fluid duct structure for a fuel cell according to claim 1, wherein said fluid conducting means, which includes said fluid supply and fluid discharge passages in an arrangement of alternate passages extending along said electrode surfaces, have spaced openings facing said electrode surface.

3. An operating fluid duct structure for a fuel cell according to claim 2, wherein said openings are arranged in the wall of said fluid supply and discharge passages in spaced relationship with respect to the direction of flow of said fluid through said passages and said openings are, in the flow direction of said operating fluid, increasingly larger so that said operating fluid is uniformly distributed over the surfaces of said electrode.

* * * * *